United States Patent [19]
Jakubowski, Jr. et al.

[11] 4,089,250
[45] May 16, 1978

[54] CARTRIDGE HOLDER WITH EXTRACTOR/INDICATOR

[75] Inventors: Thaddeus Jakubowski, Jr., Long Beach; Herman R. Kietzman, Jr., Cypress, both of Calif.

[73] Assignee: McDonnell Douglas Corporation, Long Beach, Calif.

[21] Appl. No.: 771,451

[22] Filed: Feb. 24, 1977

[51] Int. Cl.² .............................................. B64D 1/06
[52] U.S. Cl. ..................................... 89/1.5 F; 42/1 D
[58] Field of Search ........................ 42/1 D; 89/1.5 F; 244/137 R

[56] References Cited

U.S. PATENT DOCUMENTS 3,056,623  10/1962  Herbert .............................. 89/1.5 F

FOREIGN PATENT DOCUMENTS 2,407,610  9/1974  Germany .......................... 244/137 R

*Primary Examiner*—Stephen C. Bentley
*Attorney, Agent, or Firm*—John P. Scholl; Walter J. Jason; Donald L. Royer

[57] ABSTRACT

An improved explosive cartridge holder having an indicator to show the presence of a cartridge and a spring and new design to assist in removal of the discharged cartridge.

3 Claims, 5 Drawing Figures

CARTRIDGE HOLDER WITH EXTRACTOR/INDICATOR

BACKGROUND OF THE PRESENT INVENTION

Military aircraft are provided with bomb racks attached to pylons on the underside of the wings and the fuselage for the carrying of bombs, rockets, and other stores. The operation of the mechanism in the bomb rack for release and ejection of the stores from the bomb rack may be by gas pressure. The gas pressure can be generated by an explosive cartridge. In the prior art bomb racks, the cartridge is held in position for use by a cylindrical threaded cartridge holder. Visual examination of the prior art holder did not reveal the presence of a cartridge in the holder and it was necessary to unscrew and remove the holder to determine if a cartridge was present. Upon firing of a cartridge to operate the mechanism in the bomb rack, the cartridge case would expand or obturate and freeze in the prior art holder making the spent cartridge case removal difficult.

A principal object of the inventive holder is to provide a visual indication of the presence of a cartridge in the bomb rack.

Another object of the inventive holder is to simplify the removal of an expanded or discharged cartridge.

The above objects and others are achieved by providing the cartridge holder with a modified internal configuration, spring-loaded spool and external indicator. The cartridge is placed in the holder against the spool and as the holder is threaded into position in the bomb rack breech, the cartridge case bears against the spool compressing the spring. As the spool is forced further into the holder against the spring, an indicator is exposed on the outside of the holder indicating a cartridge is present. After the cartridge is fired, the cartridge holder is removed from the bomb rack breech. The force of the spring behind the spool assists in ejection of the cartridge from the holder. By altering the internal configuration of the cylindrical cartridge holder by enlarging the diameter of the open end of the holder, removal of an expended cartridge is facilitated.

DETAILED DESCRIPTION OF ILLUSTRATIVE EMBODIMENTS

Figure 1:
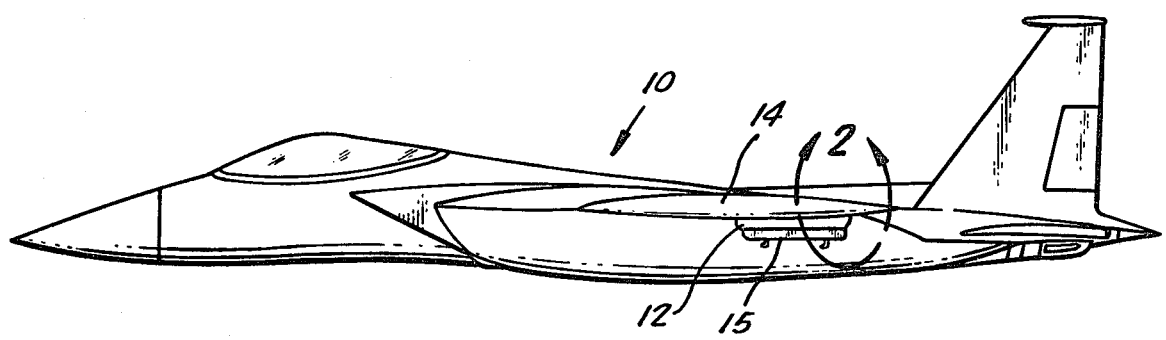
FIG. 1 is an aircraft with a pylon containing a bomb rack under its left wing to carry external stores.

In FIG. 1 an aircraft 10 is shown in pylon 12 located under its left wing 14. Attached to the pylon is a bomb rack 15. The bomb rack 15 is for carrying external stores such as bombs, rockets, or fuel tanks (not shown). In order to drop the external store, a gas pressure is created within the bomb rack breech which moves the storeholding mechanism to the release position and in some cases activates an ejection mechanism to assure that the store will clear the aircraft at the desired angle.

Figure 2:
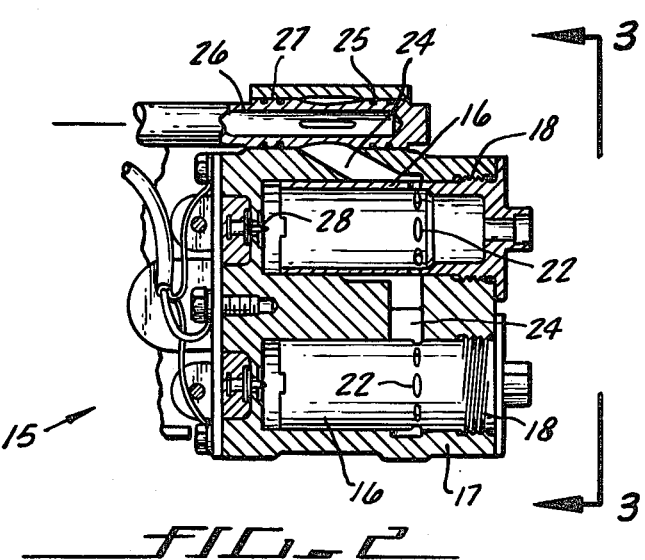
FIG. 2 is an enlarged cross-section of the aft end of the bomb rack of FIG. 1 including the breech section.

FIG. 2 is an enlarged sectional elevational view of the rear portion of the bomb rack 15 including breech section 17 having two cartridge holders 16. The upper cartridge holder 16 is sectioned through its diameter. The cartridge holders 16 have circumferential threads 18 which engage the threads in the interior cylindrical holes in the aft end of the bomb rack breech 17.

The cartridge holders 16 have circumferential gas ports 22. These gas ports 22 permit the flow of gas from the interior of the cartridge and cartridge holder 16 into collector passage 24 in the breech 17 and into gas line 26. The gas passing into the line is directed to the operative mechanism in the bomb rack (not shown).

An electrical pulse to the firing pins 28 detonates the explosive cartridge to produce the gas to operate the release and any ejection mechanism in the bomb rack.

Figure 3:
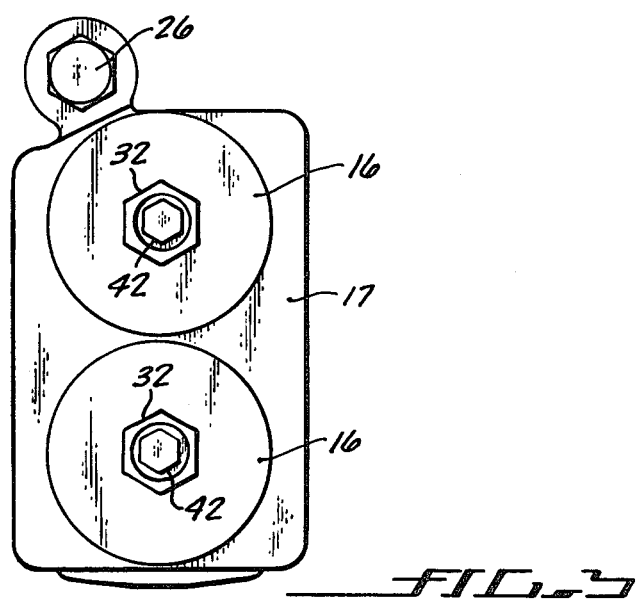
FIG. 3 is an elevational view along the line 3—3 of FIG. 2.

FIG. 3 is a rear elevational view along the lines 3—3 of FIG. 2. The bomb rack breech 17 is shown with two cylindrical cartridge holders 16 in place. Gas line 26 is inserted into the breech 17 to receive gas from the explosive cartridge. The cartridge holder 16 has hexagonal-shaped lug 32 to provide means for threading the cartridge holder 16 into the breech 17.

In FIG. 2 elastomeric O-rings 25 located in circumferential grooves 27 in gas line 26, seal the gas line in the breech 17.

Figure 4:
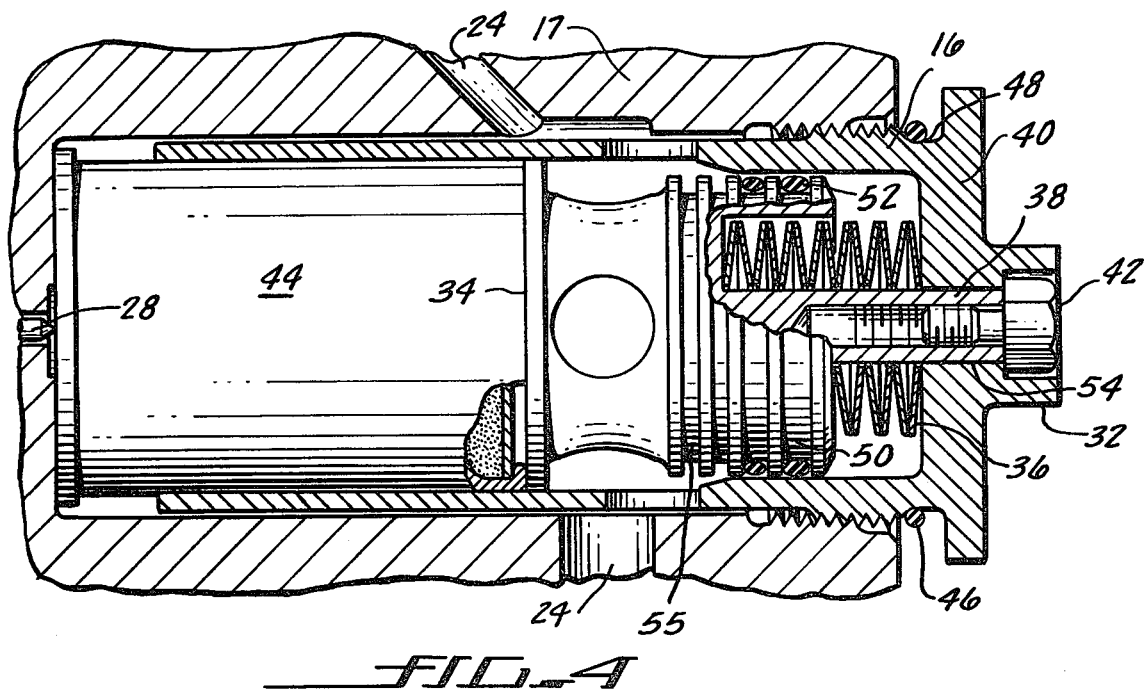
FIG. 4 is an enlarged sectional view of a cartridge holder containing an explosive cartridge, the holder is positioned partly in the bomb rack breech.

In FIG. 4 the inventive cartridge holder 16 is shown partially threaded into the breech 17. The cartridge holder 16 contains a cylindrical spool 34. Disk springs 36 surround shoulder 38 of the spool 34 and are located between spool 34 and rear wall 40 of the cartridge holder 16. Assembly bolt 42 threads into shoulder 38 of spool 34 and retains spool 34 within cartridge holder 16.

An explosive cartridge 44 is located in the open end of the cartridge holder 16. An electric firing pin 28 located in breech 17 bears against the detonator located in the cartridge 44.

Figure 5:
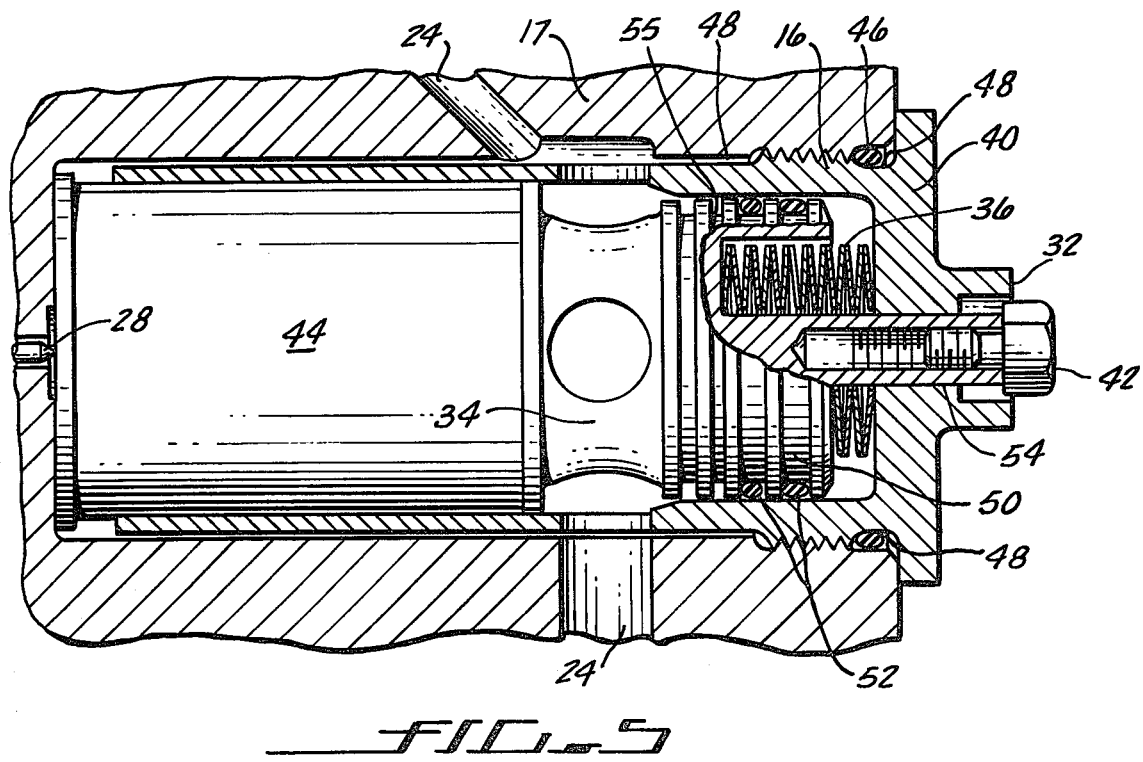
FIG. 5 is an enlarged sectional view of a cartridge holder containing an explosive cartridge in place for use in a bomb rack breech.

In FIG. 5 cartridge holder 16 has been threaded completely into breech 17. The cartridge 44, bearing against the breech 17, has pushed spool 34 into the holder 16 and compressed disk springs 36. In forcing spool 34 into the cartridge holder 16 assembly, bolt 42 is exposed beyond lug 32 indicating the presence of cartridge 44 in the holder 16.

A first elastomeric O-ring seal 46 is placed in a groove 48 in the outside of cartridge holder 16 and seals the cartridge holder 16 within breech 17 and prevents the escape of gas that has passed through the threads.

Cylindrical spool 34 has circumferential grooves 50 cut in its outer surface. A second set of elastomeric O-rings 52 are placed in grooves 50 and seal the spool 34 in the cartridge holder 16 preventing the escape of gas through the hole 54 in the end wall 40 of cartridge holder 16. Labyrinths 55 are also cut into spool 34 to cause gas pressure drop and assist O-rings in preventing escape of gas through hole 54.

The inside of the cylindrical cartridge holder 16 is tapered so that the open end of the cartridge holder 16 has a larger internal diameter than the diameter of the cartridge holder where the cartridge abuts the spool. The purpose of the enlargement of the inside of the holder 16 toward the open end is to assist in the removal of the cartridge 44 after it has been fired and the cartridge case has expanded. In certain prior art cartridge holders, when the cartridge was fired, the case expanded and wedged in the holder making the cartridge removal difficult.

The force exerted by the disk springs on the spool and expended cartridge facilitates the removal of the expended cartridge case. Tapering the inside of the holder toward the open end further facilitates removal.

In operation, the cartridge holder is removed from the breech 17 by placing a wrench on lug 32. When the holder 16 is completely removed from breech 17, an explosive cartridge 44 is inserted. The holder is then placed in the breech 17 and threaded completely into breech 17. When the cartridge holder 16 is completely threaded into breech 17, the head of assembly bolt 42 extends beyond lug 32 and indicates the presence of a cartridge within the holder 16.

After the cartridge 44 has been fired, the cartridge holder 16 is removed by unscrewing it from the breech 17. As the cartridge holder is removed from breech 17, disk springs 36 expand against spool 34, moving it toward the open end of holder 16. Because the inside of cartridge holder 16 has been tapered toward the open end, the cartridge 44 slides out of holder 16 and removal is facilitated.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, since various other obvious modifications may occur to persons having ordinary skill in the art.

What is claimed is:

1. An improved holder to retain an explosive cartridge in a breech comprising:
    a cylinder substantially closed on one end, the opposite open end designed to be received into the breech, said cylinder having an enlarged internal diameter at the open end and gas escape ports near the closed end;
    a spool sized to fit within the cylinder;
    indicator means attached to the spool observable at the closed end of the cylinder;
    spring means to bias the spool toward the open end of the cylinder and force the cartridge from the holder and to bias the indicator means into the cylinder.

2. The improved holder of claim 1 wherein the indicator means is an elongated member attached to the spool that passes through the substantially closed end of the cylinder and is exposed to view when a cartridge is contained in the holder emplaced in the breech.

3. The improved holder of claim 2 wherein the spring means comprises disk springs surrounding the elongated member, said springs biasing the spool toward the open end of the holder.

* * * * *